United States Patent
Jensen

[11] 3,883,412
[45] May 13, 1975

[54] DESALINATION PROCESS

[75] Inventor: Richard E. Jensen, Columbia, Md.

[73] Assignee: The United States of America as represented by the Secretary of the Navy, Washington, D.C.

[22] Filed: Jan. 30, 1974

[21] Appl. No.: 438,089

[52] U.S. Cl. ............................ 204/149; 204/180 R
[51] Int. Cl. ......... C02c 5/12; C02b 1/82; B01k 3/08
[58] Field of Search ..................... 204/149, 180 R

[56] References Cited
UNITED STATES PATENTS

| | | | |
|---|---|---|---|
| 1,603,298 | 10/1926 | Speed | 204/151 X |
| 3,244,612 | 4/1966 | Murphy | 204/294 |
| 3,276,911 | 10/1966 | Schoeneweis | 204/283 X |
| 3,441,488 | 4/1969 | Onstott | 204/149 |
| 3,515,664 | 6/1970 | Johnson et al. | 204/301 |
| 3,533,929 | 10/1970 | Evans et al. | 204/149 |
| 3,553,092 | 1/1971 | Mund et al. | 204/180 P |
| 3,658,674 | 4/1972 | Benak | 204/149 X |
| 3,766,034 | 10/1973 | Veltman | 204/149 |
| 3,804,733 | 4/1974 | Bennion et al. | 204/149 X |

Primary Examiner—John H. Mack
Assistant Examiner—A. C. Prescott
Attorney, Agent, or Firm—R. S. Sciascia; J. A. Cooke; W. W. Cochran

[57] ABSTRACT

A new apparatus and method for desalinating water. The principal impurities in sea water or brackish are in ionic form, which are removed by leaving purified water behind. The energy required to remove the ions may be partially recovered in this process and reused for further desalination, resulting in a further decrease in operating costs.

2 Claims, 6 Drawing Figures

3,883,412

DESALINATION PROCESS

BACKGROUND OF THE INVENTION

The present invention relates generally to desalination of water and more specifically to desalination through the use of charged electrodes.

There are several methods used at present to desalinate water. These include electrodialysis, reverse osmosis, distillation, freezing and ion exchange. All these methods require the expenditure of large amounts of energy so that the purified water is relatively expensive. Less expensive methods are clearly needed.

Of the methods listed above, electrodialysis and ion exchange are similar in that they both remove the ions from the saline water. Ion exchange resins are very effective in removing ionic impurities from water but reactivation of the resins is relatively expensive and ion exchange is one of the more expensive methods of purifying water. Electrodialysis on the other hand, removes ionic impurities from the water by diffusion through a suitable membrane under the influence of an electric field. A few electron volts expenditure of energy is required for each ion removed for this method. The expenditure of energy for a unit volume of water thus varies directly with the concentration of ions in the water, so that the cost of purification increases with the impurity concentration. This method is used principally for purifying brackish water where the ion concentration is low compared to sea water.

In reverse osmosis, water is forced to diffuse through a membrane under the influence of a large pressure differential across the membrane which collected the ions. The pressure required to cause reverse osmosis varies directly as the ion concentration, so that the energy expenditure varies directly as the impurity concentration. This method requires an energy expenditure which is about the same as the electrodialysis method. Again, reverse osmosis is used principally for purifying brackish waters.

In distillation, the water is boiled off leaving the impurities behind. This method is probably the principal way of desalinating water. Yet the energy expenditure in simple distillation remains high and this method in general is expensive. However, "Multiple effect" distillation methods have been developed in which a large fraction of the energy of vaporization is recovered and reused, thus lowering the energy expenditure considerably. Distillation using multiple effect apparatus is at present the least expensive method for large scale water desalination, but the energy expenditire is still about ½ electron volt for each ion removed from sea water. In addition, the energy per ion increases as the ion concentration decreases, so that the other methods described are less expensive for lower ion concentrations.

As for the method of freezing, it is well known that when saline water starts to freeze the ions therein tend to remain in solution while the ice formed is much purer than the water from which it is formed. The ice is then removed before freezing is complete and thawed to form purer water. The energy expenditure is high for a simple freezing process, although it is lower than simple distillation. Multiple effect methods have been developed for freezing to lower the energy requirements, however, and in the long-run the cost is expected to be about the same.

In all the methods discussed above, the energy required for each ion removed varies from about ½ to several electron volts.

SUMMARY OF THE INVENTION

The present invention overcomes the disadvantages and limitations of the prior art by providing an improved apparatus and method for desalination of water. It consists of creating a space charge layer through the use of porous charged electrodes submerged in the saline solution and thereafter removing the water from the impurity ions. The energy used in this process can be partially recovered by replacing the electrodes in another saline solution and collecting the energy produced in the external circuit due to the diffusion of the ions collected by the electrodes in the saline solution.

It is therefore an object of the present invention to provide an improved device for desalinating water.

It is also an object of the invention to provide an improved desalinator process.

Another object of the invention is to provide a device for desalination of water requiring a low energy expenditure.

Another object of the invention is to provide a desalination process requiring a low energy expenditure.

Another object of the invention is to provide a device for desalinating water having both high and low concentrations of ions at a low energy expenditure.

Another object of the invention is to provide a desalination process for removing both high and low concentrations of ions from a saline solution at a low energy expenditure.

Other objects, advantages and novel features of the invention will become apparent from the following detailed description of the invention when considered in conjunction with the accompanying drawings wherein:

DETAILED DESCRIPTION OF THE PREFERRED EMBODIMENT

Figure 1A:
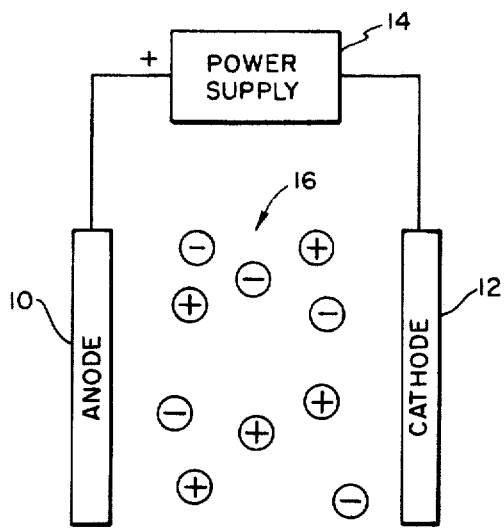
FIG. 1A is a schematic diagram of the preferred embodiment at the initiation of operation.
Figure 1B:
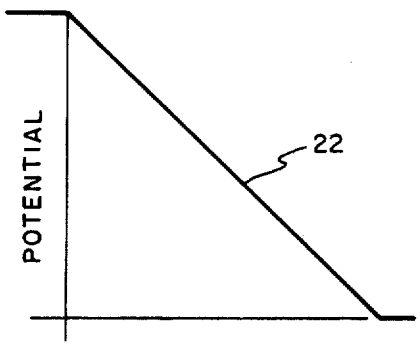
FIG. 1B is a graph of the potential gradient of the preferred embodiment at the initiation of operation.
Figure 1C:
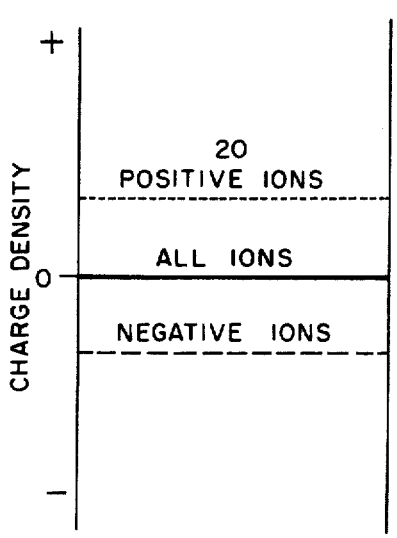
FIG. 1C is a graph of the charge density of the preferred embodiment at the initiation of operation.

The principle of operation is illustrated schematically in the figures. FIG. 1a shows a basic cell which consists of two conducting electrodes 10 and 12 immersed in the water to be desalinated. An external dc power supply 14 is connected to the electrodes. The impurity ions 16 are distributed at random through the water as indicated schematically by the circles with positive and negative signs enclosed. The ion density distribution is shown in FIG. 1c. When the power supply 14 is first turned on, a uniform potential gradient occurs across the cell, as illustrated in FIG. 1b. Under the influence of the electric field the positive ions 20 move towards the cathode 12 and the negative ions 18 to the anode 10.

The ionic motion established by the electric field causes an increase in the concentration of positive ions 20 near the cathode 12 and of negative ions 18 near the anode 10. A space charge region 22 is formed in the vicinity of each electrode, as shown in FIG. 2c. The presence of the space charge regions 22 causes an increase in the electric field strength near the electrodes and a decrease in the center of the cell, as shown in FIG. 2b. The potential drop across the cell is no longer uniform, but a greater fraction of the drop occurs across the space charge 22 than would otherwise be the case.

If the cell is allowed to reach equilibrium the potential drop will all occur across the space charge regions 22, and none of the drop will occur in the interior of the cell, as shown in FIG. 2b. It is important that the potential across the cell be maintained below the threshold for electrolysis, otherwise neutralization of the ions will occur at the electrodes and they will diffuse out of the space charge layers 22. The space charge layers 22 at the electrodes 10 and 12 have the effect of screening the interior of the cell from the electrode potentials. As such, there is no electric field in the interior of the cell, and the current through the cell stops, resulting in no further motion of the ions toward the electrodes. The concentrations of ions near the electrodes 10 and 12 as a consequence is much higher than it was before application of the electrical potential as shown in FIG. 2c, and the ion concentration in the center of the cell is thereby reduced. Partial deionization can be accomplished by removal of the water near the center of the cell without disturbing the space charge layers. More complete desalination may be accomplished by treating the water in several successive cells.

Energy supplied by the external power supply 14 is stored in the ions 18 and 20 of the space charge layers 22 which can be recovered in an external circuit. This is accomplished by refilling the cell with impurified water after the impurified water has been removed. This causes the ions 16 to diffuse in the unpurified water away from the electrodes, generating a current in the external circuit. In this manner, the cell behaves as a capacitor which can be charged and discharged so as to store energy, except for the fact that the charge carriers in this case are ions rather than electrons.

When the ions have diffused away from the electrodes, destroying the space charge layers 22, the cell is drained of the impurities and the entire cycle of purification restarted.

Figure 2A:
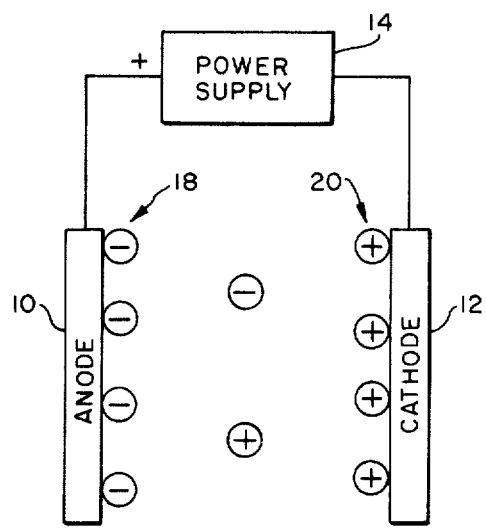
FIG. 2A is a schematic diagram of the preferred embodiment in operation.
Figure 2B:
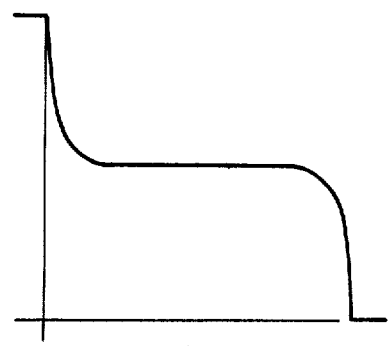
FIG. 2B is a graph of the potential gradient of the preferred embodiment in operation.
Figure 2C:
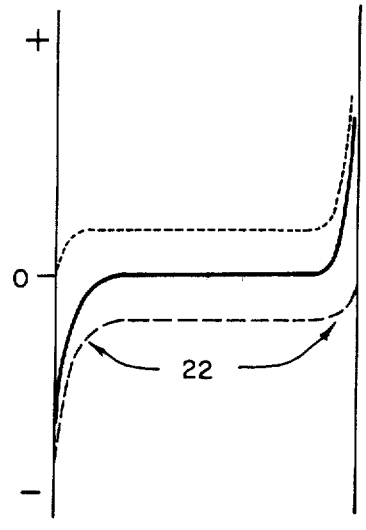
FIG. 2C is a graph of the charge density of the preferred embodiment in operation.

The simple cell shown in FIGS. 1A and 2A has only two electrodes, but there is no limit to the number of electrodes which may be used in a purification cell. It is important that the voltage applied across the cell is sufficiently low to prevent electrolysis, otherwise the ions will be neutralized and diffuse away from the electrodes precluding recovery of energy.

The impurity ions to be removed are all contained within the space charge layer 22. The volume of the space charge region is determined by the product of the space charge thickness and with the electrode area. The thickness of the space charge layer for sea water and brackish water is very thin, on the order of Angstroms. Various porous materials can be used which increase the surface are of the electrodes and thereby the collection efficiency of the cell. For example, metal powders may be sintered to form a solid electrode wherein both the external and internal surfaces are useable. The same is true for activated charcoal. For both of these materials, the usable surface area is, on an average, $10^5$ times larger than the external surface area.

The porous electrodes serve an additional purpose. When the purified water is drained from the cell, the water in the electropores, along with the ions collected, will remain behind. There is therefore no tendency for these ions to mix with the water during removal.

After the purified water has been removed from the cell, the electrodes must be cleansed on the ions. The energy stored; the space charge layer may be partially reclaimed and the electrodes cleansed in the manner disclosed above.

In actual use a series of purification cells could be used; some operating on the cleansing cycle would be used to power those on the purification cycle. External power would be use only to make up losses. Because this energy may be partially recovered and used again the energy per ion removed can be reduced to 0.1 eV or less.

The primary advantage of the present device is that it requires considerably less energy at lower voltage levels to desalinate water than the previous methods. This is due primarily to the recovery of energy which not only cleans the electrode of impurity ions but also helps to power additional cells during their purification cycle.

Obviously many modifications and variations of the present invention are possible in light of the above teachings. For example, any conductive porous material could be used as an electrode. This includes sintered metal powders, metal powders confined in a suitable enclosure, and activated charcoal powder confined in a suitable enclosure.

It is therefore to be understood that within the scope of the appended claims the invention may be practiced otherwise than as specifically described.

What is claimed as new and desired to be secured by Letters Patent of the United States is:

1. A method of removing ions from water comprising the steps of:
   applying a low level positive voltage to a porous anode submerged in said water to form a space charge layer of negative ions in and around said porous anode;
   applying a low level negative voltage to a porous cathode submerged in said water to form a space charge layer of positive ions in and around said porous cathode.
   separating said anode and said cathode from said water so as to remove said positive and negative ions from said water;
   combining ionized water with said porous anode and said porous cathode
   removing said low level positive and negative voltages from said porous anode and cathode respectively
   using low level voltages generated by said anode and said cathode to further deionize water.

2. A method of removing ions from a first water solution comprising the steps of:
   applying a low level positive voltage to a porous anode submerged in said first water solution to form a space charge layer of negative ions in and around said porous anode;
   applying a low level negative voltage to a porous cathode submerged in said first water solution to form a space charge layer of positive ions in and around said porous cathode;

separating said anode and said cathode from said water so as to remove said positive and negative ions from said water;

placing said porous anode and said porous cathode in a second water solution having an ion density less than the charge density of said space charge layer of both of said porous anode and said porous cathode;

utilizing an electrical potential created between said porous anode and said porous cathode by the migration of said positive and negative ions from said space charge layer of said porous anode and said porous cathode to further deionize an additional saline solution.

* * * * *